US009256295B2

(12) United States Patent
Rak et al.

(10) Patent No.: US 9,256,295 B2
(45) Date of Patent: Feb. 9, 2016

(54) OUTWARDLY DECREASING HEIGHT KEYS FOR A HANDHELD ELECTRONIC DEVICE KEYBOARD

(75) Inventors: Roman P. Rak, Waterloo (CA); Jason T. Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 916 days.

(21) Appl. No.: 11/738,981

(22) Filed: Apr. 23, 2007

(65) Prior Publication Data

US 2008/0074394 A1    Mar. 27, 2008

Related U.S. Application Data

(60) Provisional application No. 60/826,898, filed on Sep. 25, 2006.

(51) Int. Cl.
*G06F 3/02*    (2006.01)
*G06F 1/16*    (2006.01)
(Continued)

(52) U.S. Cl.
CPC .............. *G06F 3/0219* (2013.01); *G06F 1/169* (2013.01); *G06F 1/1626* (2013.01);
(Continued)

(58) Field of Classification Search
CPC ... G06F 1/1626; G06F 1/1656; G06F 1/1664; G06F 1/169; G06F 3/0202; G06F 3/0219; G06F 3/04886; G06F 3/03549; H01H 13/14; H01H 2219/062; H01H 2221/012
USPC ................. D14/399, 391, 331–333, 461, 455
See application file for complete search history.

(56) References Cited

U.S. PATENT DOCUMENTS

| 1,468,566 | A | 9/1823 | Hall |
| 5,046,739 | A | 9/1991 | Reichow |

(Continued)

FOREIGN PATENT DOCUMENTS

| EP | 1094482 | 4/2001 |
| EP | 000716238-0001 | 4/2007 |

(Continued)

OTHER PUBLICATIONS

International Search Report for PCT/CA07/000686, Issued on Aug. 13, 2007.

(Continued)

*Primary Examiner* — Temesgh Ghebretinsae
*Assistant Examiner* — Keith Crawley
(74) *Attorney, Agent, or Firm* — Jeffrey N. Giunta; Fleit Gibbons Gutman Bongini & Bianco P.L.

(57) ABSTRACT

A handheld wireless communication device includes features that make it easier to differentiate among various keys and to correctly select a desired key. It also includes features that make the device more comfortable to use. In particular, corner keys have decreasing height profiles to make above-adjacent keys easier to reach and distinguish. Additionally, lowermost, outermost portions of the corner keys may be somewhat truncated. Flanking keys in a navigation row slant toward and are flush with peripheral edges of a navigation tool assembly and have outer edges that are higher than inner edges of adjacent outer keys. The outer edges of the flanking keys may be hump-shaped or crowned. The longitudinally central portion of the device is narrower than the ends of the device, and the corners of the device are contoured to enhance comfort in a user's hand. Soft-touch materials are employed in hand-contacting portions of the device.

15 Claims, 14 Drawing Sheets

(51) Int. Cl.
*G06F 3/0354* (2013.01)
*G06F 3/0488* (2013.01)
*H01H 13/14* (2006.01)

(52) U.S. Cl.
CPC .......... *G06F 1/1656* (2013.01); *G06F 1/1664* (2013.01); *G06F 3/0202* (2013.01); *G06F 3/03549* (2013.01); *G06F 3/04886* (2013.01); *H01H 13/14* (2013.01); *H01H 2219/062* (2013.01); *H01H 2221/012* (2013.01)

(56) References Cited

U.S. PATENT DOCUMENTS

| | | | |
|---|---|---|---|
| D356,788 S | 3/1995 | Mizusugi et al. | |
| D375,748 S | 11/1996 | Hartman | |
| D389,157 S | 1/1998 | Williams | |
| D393,628 S | 4/1998 | Ledbetter et al. | |
| 5,898,933 A * | 4/1999 | Kaschke | 455/575.7 |
| D445,409 S | 7/2001 | Segers | |
| 6,370,018 B1 | 4/2002 | Miller, Jr. et al. | |
| 6,480,185 B1 | 11/2002 | Kiljander et al. | |
| D470,150 S | 2/2003 | Lewis | |
| D470,854 S | 2/2003 | Jones | |
| 6,571,086 B1 * | 5/2003 | Uusimaki | 455/90.3 |
| D480,057 S | 9/2003 | Ho-Cheun et al. | |
| 6,628,511 B2 | 9/2003 | Engstrom | |
| 6,671,170 B2 | 12/2003 | Webb et al. | |
| D488,155 S | 4/2004 | Wilson | |
| D502,159 S | 2/2005 | Chan et al. | |
| 6,919,879 B2 * | 7/2005 | Griffin et al. | 345/168 |
| D509,493 S | 9/2005 | Winebrenner et al. | |
| 6,961,052 B1 | 11/2005 | Vaziri | |
| D519,502 S | 4/2006 | Hawkins | |
| 7,050,764 B2 * | 5/2006 | Carlson | 455/90.3 |
| D524,803 S | 7/2006 | Tyneski et al. | |
| D527,001 S | 8/2006 | Pletikosa | |
| D528,098 S | 9/2006 | Corley et al. | |
| D532,415 S | 11/2006 | Chen | |
| D533,165 S | 12/2006 | Knight et al. | |
| D537,082 S | 2/2007 | Griffin | |
| D550,679 S | 9/2007 | Griffin | |
| D553,136 S | 10/2007 | Rak | |
| D556,207 S | 11/2007 | Griffin | |
| D559,223 S | 1/2008 | Kim et al. | |
| D562,332 S | 2/2008 | Rak et al. | |
| D563,415 S | 3/2008 | Griffin et al. | |
| D570,840 S | 6/2008 | Rak et al. | |
| 7,642,934 B2 | 1/2010 | Scott | |
| 7,694,231 B2 | 4/2010 | Kocienda et al. | |
| 7,953,448 B2 | 5/2011 | Pletikosa et al. | |
| 2002/0060518 A1 | 5/2002 | Duineveld et al. | |
| 2002/0063690 A1 | 5/2002 | Chung et al. | |
| 2002/0110238 A1 * | 8/2002 | Kiernan | 379/433.07 |
| 2002/0149566 A1 | 10/2002 | Sarkissian | |
| 2003/0067445 A1 | 4/2003 | Hirshberg et al. | |
| 2003/0083020 A1 * | 5/2003 | Langford | 455/90 |
| 2003/0201983 A1 | 10/2003 | Jokinen et al. | |
| 2004/0087333 A1 * | 5/2004 | Hutchison et al. | 455/550.1 |
| 2004/0105220 A1 | 6/2004 | Webb et al. | |
| 2004/0229663 A1 | 11/2004 | Tosey et al. | |
| 2005/0136853 A1 * | 6/2005 | Lenchik et al. | 455/90.3 |
| 2005/0190083 A1 | 9/2005 | Tyneski et al. | |
| 2005/0202840 A1 * | 9/2005 | Kespohl et al. | 455/550.1 |
| 2005/0235021 A1 * | 10/2005 | Chen et al. | 708/142 |
| 2005/0242972 A1 * | 11/2005 | Lazaridis et al. | 341/22 |
| 2006/0062626 A1 * | 3/2006 | Hamilton et al. | 400/490 |
| 2006/0079292 A1 | 4/2006 | Carlson et al. | |
| 2006/0187210 A1 | 8/2006 | Griffin et al. | |
| 2006/0209032 A1 | 9/2006 | Chiang et al. | |
| 2007/0188462 A1 | 8/2007 | Lee et al. | |
| 2007/0234208 A1 | 10/2007 | Scott | |
| 2007/0238489 A1 | 10/2007 | Scott | |
| 2007/0259698 A1 | 11/2007 | Chen et al. | |
| 2007/0268250 A1 * | 11/2007 | Min | 345/158 |
| 2008/0055253 A1 | 3/2008 | Moosavi et al. | |
| 2008/0101594 A1 | 5/2008 | Rak et al. | |
| 2008/0252494 A1 * | 10/2008 | Ahlberg et al. | 341/22 |
| 2009/0051658 A1 | 2/2009 | Frohlund | |
| 2009/0102799 A1 | 4/2009 | Moosavi et al. | |
| 2009/0146848 A1 * | 6/2009 | Ghassabian | 341/22 |

FOREIGN PATENT DOCUMENTS

| | | |
|---|---|---|
| JP | 2003084887 | 3/2003 |
| JP | 2003288154 | 10/2003 |

OTHER PUBLICATIONS

European Search Report; EP 07719612.9; dated Oct. 5, 2009.
Notice of Allowance, U.S. Appl. No. 29/279,207; dated Oct. 24, 2007.
EP Examination Report from related European Patent Application No. 07719612.9; Jan. 20, 2012; 5 pages.
BlackBerry Curve 8300, announced May 2007, http://www.gsmarena.com/blackberry_curve_8300-1979.php.
BlackBerry Pearl 8100, announced Sep. 2006, http://www.gsmarena.com/blackberry_pearl_8100-1701.php.
Non-Final Office Action dated Sep. 19, 2011. In corresponding U.S. Appl. No. 11/861,118.
Palm Treo 750v, announced Sep. 2006, http://www.gsmarena.com/palm_treo_750v-1704.php.
International Written Opinion dated Aug. 13, 2007 in corresponding application No. PCT/CA2007/000686.
Office Action dated May 15, 2009 in Chinese corresponding application No. 200790000091.2.
Gordon, Meredith; Examiner; Article 94(3) EPC from related European Patent Application No. 07719612.9 dated Aug. 14, 2013; 6 pages.

* cited by examiner

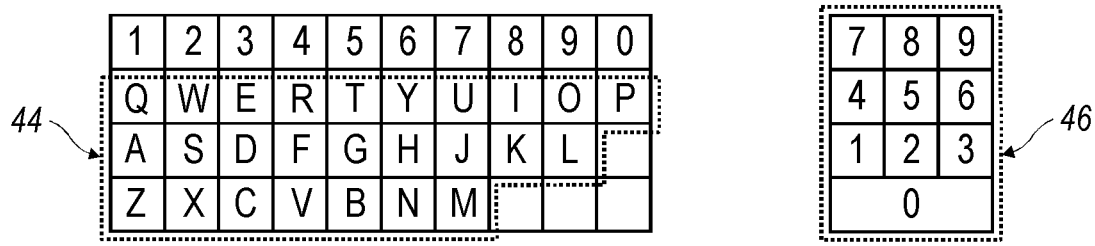
FIG. 4
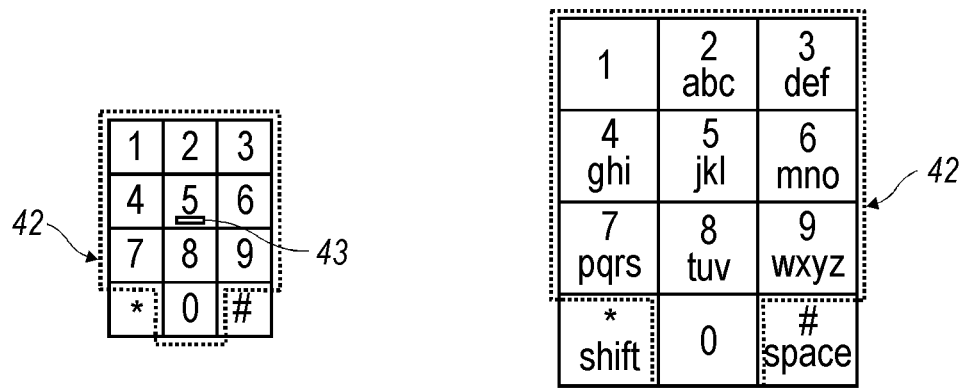
FIG. 5  FIG. 6

OUTWARDLY DECREASING HEIGHT KEYS FOR A HANDHELD ELECTRONIC DEVICE KEYBOARD

CROSS REFERENCE

The present application claims the benefit of U.S. Provisional Application No. 60/826,898, filed Sep. 25, 2006. Said application is expressly incorporated herein by reference in its entirety.

FIELD

This disclosure, in a broad sense, is directed toward handheld electronic devices; and more specifically to handheld communication devices that have wireless communication capabilities and the networks within which the wireless communication devices operate. The present disclosure further relates to the ergonomics of such devices, including features which enhance a user's ability to tactilely differentiate among various keys on the device and which make such devices more comfortable in the user's palm and which facilitate thumb-manipulation of an included navigation tool on the device.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

Another keyboard spacing problem is that of finger overlap and key differentiation when keys are smaller than the user's finger and are spaced closely together—a situation that arises particularly if a full keyboard (as opposed to a reduced-format keyboard) arrangement is implemented. Furthermore, as handheld wireless communication devices become used more and more frequently by a given user, and as they become smaller, comfort within the user's hand becomes a bigger concern. The present disclosure provides solutions to these concerns.

BRIEF DESCRIPTION OF THE DRAWINGS

Examplary methods and arrangements conducted and configured according to the advantageous solutions presented herein are depicted in the accompanying drawings wherein:

FIG. 3a illustrates an examplary QWERTY keyboard layout;

FIG. 3b illustrates an examplary QWERTZ keyboard layout;

FIG. 3c illustrates an examplary AZERTY keyboard layout;

FIG. 3d illustrates an examplary Dvorak keyboard layout;

FIG. 4 illustrates a QWERTY keyboard layout paired with a traditional ten-key keyboard;

FIG. 5 illustrates ten digits comprising the numerals 0-9 arranged in a traditional, ITU Standard E. 161 numeric telephone keypad layout, including the * and # keys flanking the 0 key;

FIG. 6 illustrates a traditional or standard phone key arrangement or layout according to the ITU Standard E.161 including both numerals and letters;

DETAILED DESCRIPTION

Figure 1:
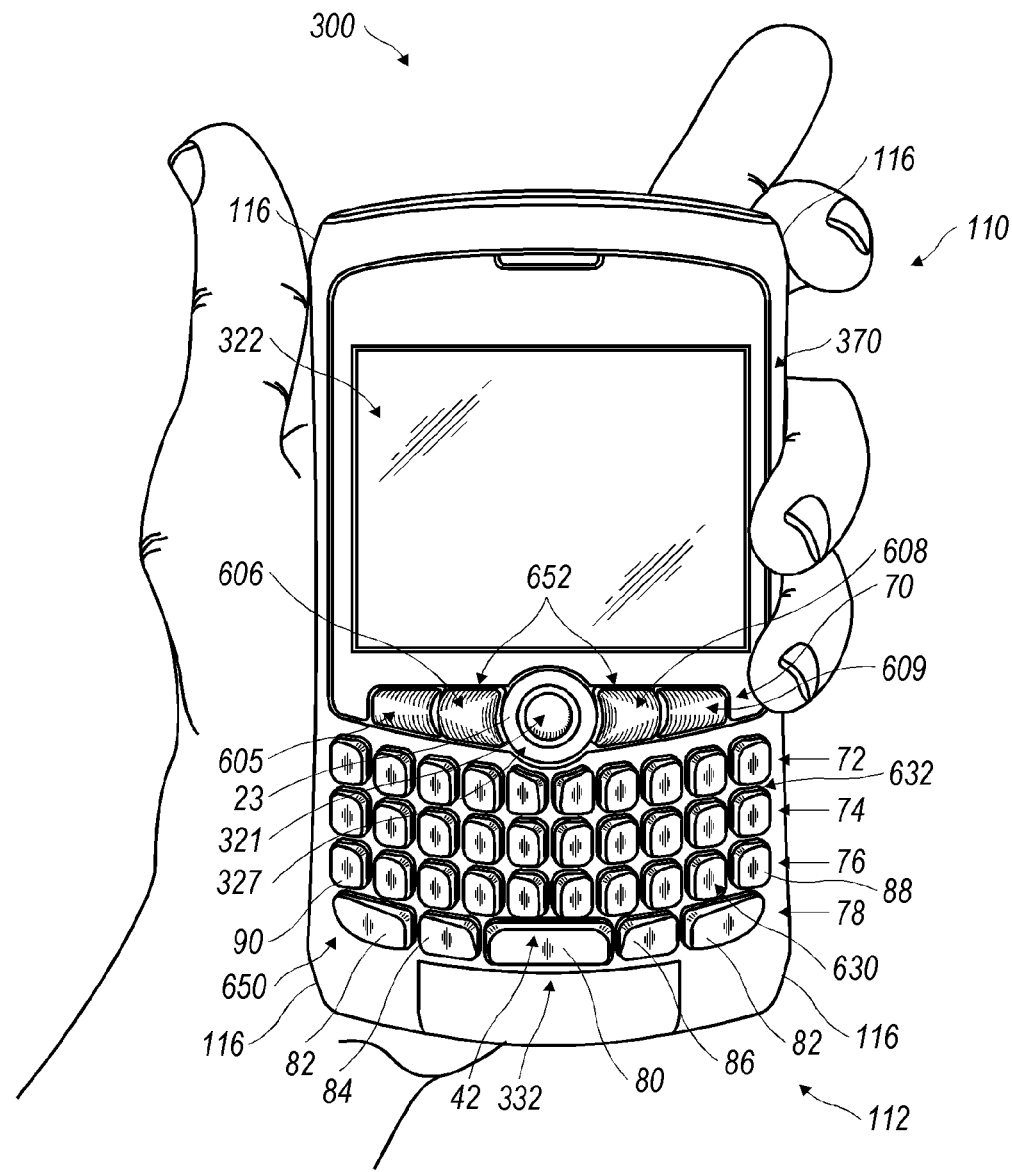
FIG. 1 illustrates a handheld communication device configured according to the present teachings cradled in the palm of a user's hand.
Figure 2:
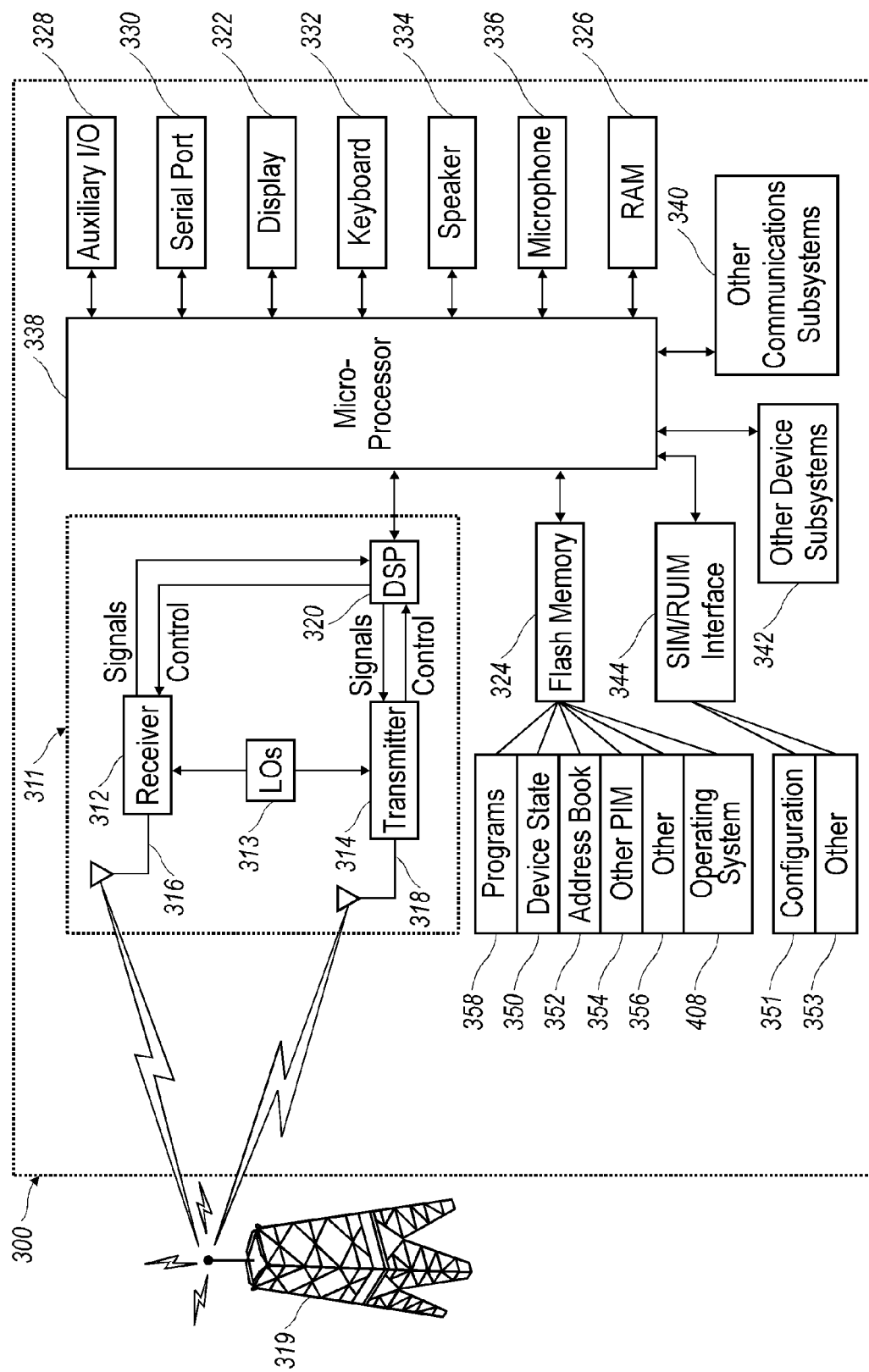
FIG. 2 is a block diagram representing a wireless handheld communication device interacting in a communication network.

An examplary handheld electronic device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the communication device 300.

Figure 9:
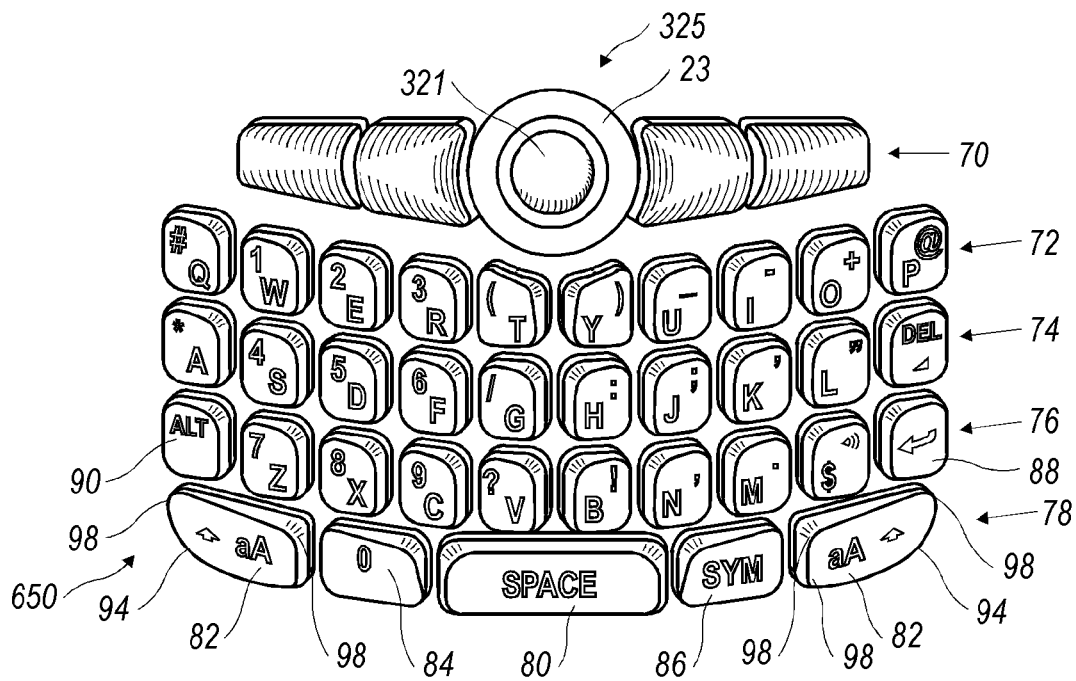
FIG. 9 illustrates on a larger scale the keyboard (keyfield and navigation row) employed in the handheld communication device illustrated in FIGS. 1 and 8.

The auxiliary I/O subsystem 328 can take the form of a variety of different navigation tools (multi-directional or single-directional) such as a trackball navigation tool 325 as illustrated in the examplary embodiment shown in FIG. 9, or a thumbwheel, a navigation pad, a joystick, or the like. These navigation tools are preferably located on the front surface of the device 300 but may be located on any exterior surface of the device 300. Other auxiliary I/O subsystems can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from FIG. 1, the handheld communication device 300 comprises a lighted display 322 located above a keyboard 332 constituting a user input and suitable for accommodating textual input to the handheld communication device 300. The front face of the device has a navigation row 70 and a key field 650 that includes alphanumeric keys 630, alphabetic keys 632, numeric keys 42, and other function keys as shown in FIG. 1. As shown, the device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem the present handheld electronic device 300 preferably includes an auxiliary input that acts as a cursor navigational tool 327 and which is also exteriorly located upon the front face of the device 300. Its front face location is particularly advantageous because it makes the tool easily thumb-actuable like the keys of the keyboard. A particularly usable embodiment provides the navigational tool 327 in the form of a trackball 321 which is easily utilized to instruct two-dimensional screen cursor movement in substantially any direction, as well as act as an actuator when the trackball 321 is depressed like a button. The placement of the navigation tool 327 is preferably above the keyboard 332 and below the display screen 322; here, it avoids interference during keyboarding and does not block the user's view of the display screen 322 during use. (See FIG. 1).

As illustrated in FIGS. 1 and 7-15e, the present disclosure is directed to a handheld wireless communication device 300 configured to send and receive text messages. The device includes a hand cradleable body configured to be held in one hand by an operator of the device during text entry. A display 322 is included that is located on a front face 370 of the body and upon which information is displayed to the operator during text entry. A key field 650 is also located on the front face 370 of the elongate body and comprises a plurality of keys including a plurality of alphanumeric keys, symbol keys, and function keys. A navigation row 70 including menu keys 652 and a navigation tool 327 is also located on the front face 370 of the body. The alphanumeric input keys comprise a plurality of alphabetic and/or numeric keys 632 having letters and/or numbers associated therewith. The order of the letters of the alphabetic keys 632 on the presently disclosed device can be described as being of a traditional, but non-ITU Standard E.161 layout. This terminology has been utilized to clearly delineate the fact that such a telephone keypad as depicted in FIG. 6 is not suitable for use in the presently disclosed device 300. Moreover, persons skilled in these arts who design devices 300 of the nature defined herein would not look to devices that include an ITU Standard E.161 alphabetic telephone keypad configuration because of the substantial deficiencies that exist where text input beyond short messaging services (SMS) is required, such as for emailing.

The handheld wireless communication device 300 is also configured to send and receive voice communications such as mobile telephone calls. To facilitate telephone calls, two call keys 605, 609 ("outer keys") are provided in the upper, navigation row 70 (so-called because it includes the navigation tool assembly 327) at the outer ends of the navigation row 70. One of the two call keys is a call initiation key 605, and the other is a call termination key 609. The navigation row 70 also includes another pair of keys ("flanking keys") that are located immediately adjacent to the navigation tool 327, with one flanking key on either side of the navigation tool 327. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the device, with different functions assigned to the outer keys and the flanking keys.

Furthermore, the device is equipped with components to enable operation of various programs, as shown in FIG. 2. In an examplary embodiment, the flash memory 324 is enabled to provide a storage location for the operating system 408, device programs 358, and data. The operating system 408 is generally configured to manage other application programs 358 that are also stored in memory 324 and executable on the processor 338. The operating system 408 honors requests for services made by application programs 358 through pre-defined application program 358 interfaces. More specifically, the operating system 408 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 408 through a user interface usually including the keyboard 332 and display screen 322. While in an examplary embodiment the operating system 408 is stored in flash memory 324, the operating system 408 in other embodiments is stored in read-only memory (ROM) or similar storage element (not shown). As those skilled in the art will appreciate, the operating system 408, device application 358 or parts thereof may be loaded in RAM 326 or other volatile memory.

In one examplary embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in the presently described examplary embodiment is equipped with an integral or internal antenna 318 for transmitting signals to the communication network 319. Likewise the communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the device 300 is significantly enhanced (if not enabled) when connectable within a communication system, and particularly when connectable on a wireless basis in a network 319 in which voice, text messaging, and other data transfer are accommodated.

Figure 7:
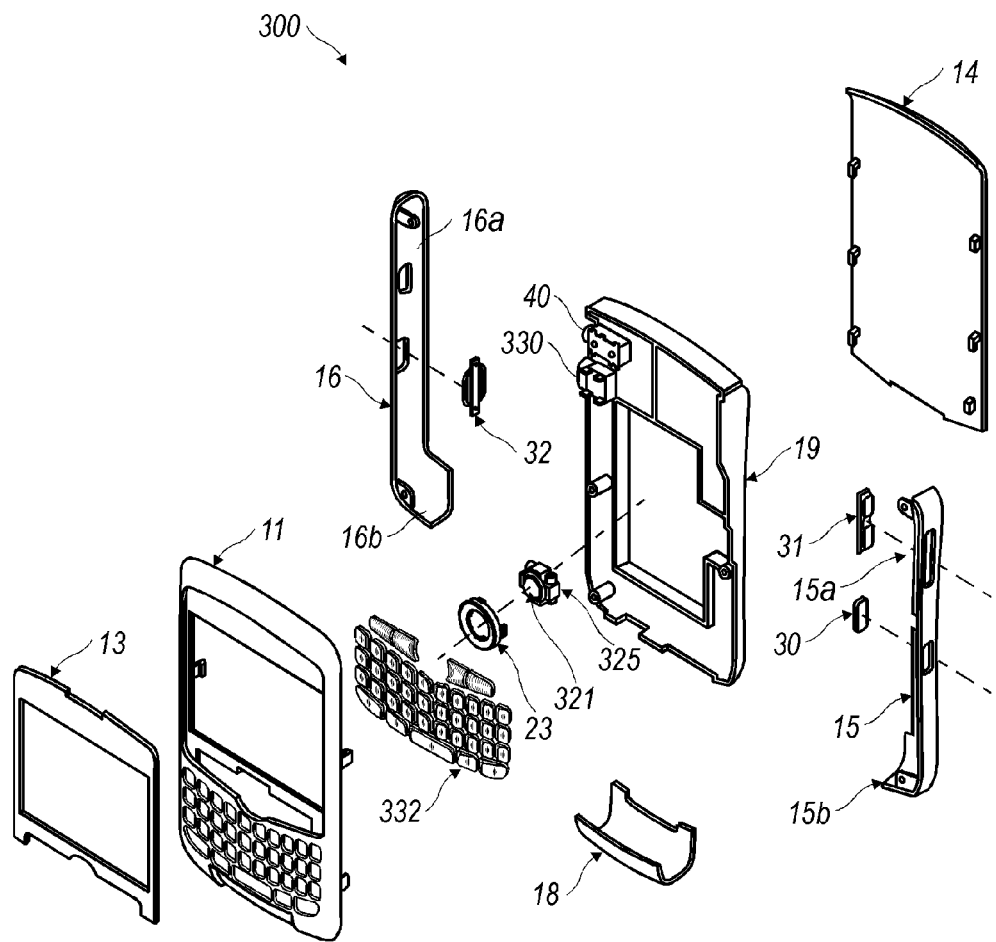
FIG. 7 is an exploded perspective view of an examplary wireless handheld electronic device, incorporating a trackball assembly as the auxiliary user input.
Figure 8:
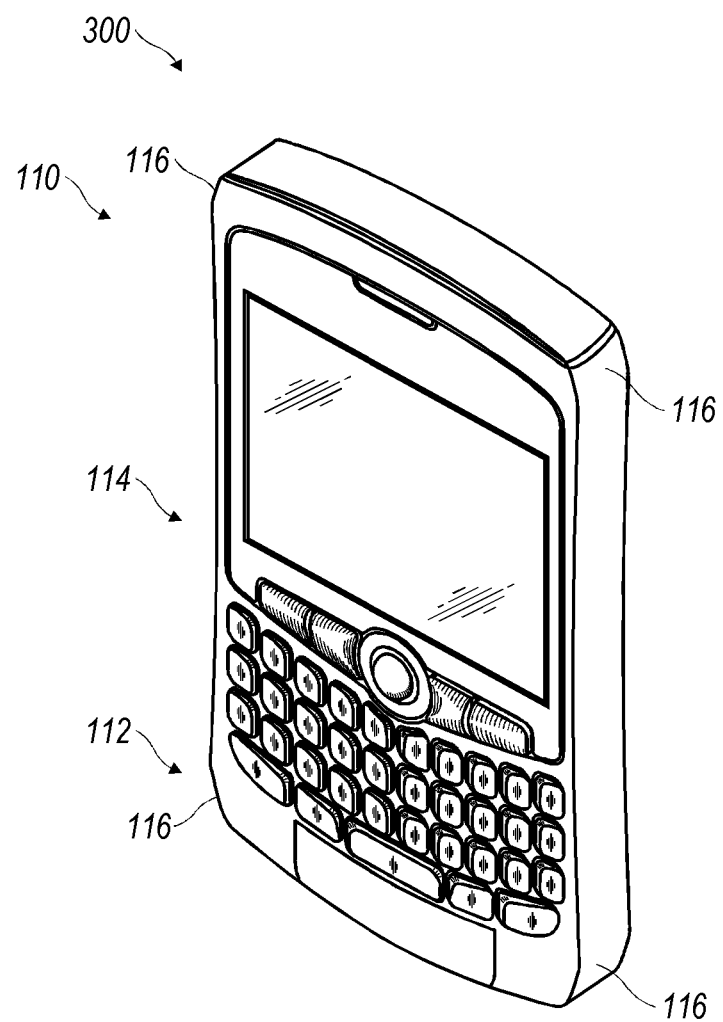
FIG. 8 is a perspective view of the handheld communication device illustrated in FIG. 1.

Integration of the trackball assembly into handheld device 300 can be seen in the exploded view of FIG. 7 showing some of the typical components found in the assembly of the handheld electronic device 300. The construction of the device benefits from various manufacturing simplifications. The internal components are predominantly constructed on a single PCB (printed circuit board, not illustrated). The keyboard 332 can be constructed from a single piece of material, and in some embodiments is made from plastic. The keyboard 332 sits over dome switches (not shown) located on the PCB in one embodiment. While in the presently described examplary embodiment one switch is provided for every key on the keyboard 332, in other embodiments more than one switch or less than one switch per key are provided. The keyboard light guide or chassis (not shown) holds the keyboard 332 and trackball navigation tool 325 in place above the PCB. A front housing cover 11 is mounted over the keyboard 332 and light guide. The front housing cover 11 also provides an attachment point for the lens 13. The lens 13 covers the display, which is typically mounted on the PCB, to prevent damage to the display screen. When assembled, the front housing cover 11 and the PCB are fixedly attached to each other and the display is positioned between the PCB and the front housing cover 11.

The trackball navigation tool 325 can be frictionally engaged with the front housing cover 11, and in one examplary embodiment the trackball navigation tool 325 is removable when the device is assembled. This allows for replacement of the trackball navigation tool 325 if/when it becomes damaged or the user desires replacement with a different type of trackball navigation tool 325. In the examplary embodiment of FIG. 7, the navigation tool 328 is a ball 321 based device. Other multidirectional navigation tools 327 such as joysticks, four-way cursors, or touch pads are also considered to be within the scope of this disclosure. The removal of the trackball navigation tool 325 is enabled through the use of an outer removable ring 23, the outer edge of which defines the periphery of the navigation tool assembly 328. The ring 23 ensures that the navigation tool 328 is properly held in place against the light guide.

A serial port (preferably a Universal Serial Bus port) 330 and an earphone jack 40 are fixedly attached to the PCB and further held in place by left side element 16. Buttons 30-32 may be attached to switches (not shown) which are connected to the PCB 12.

Final assembly involves placing a bottom piece 18 in contact with a front housing cover 11 and back support frame 19. Furthermore, the assembly interconnects right side element 15 and left side element 16 with the front housing cover 11, bottom piece 18, back support frame 19, PCB, and lens 13. These side elements 15, 16 provide additional protection and strength to the support structure of the device 300. In the presently described examplary embodiment, backplate 14 is removably attached to the back support frame 19.

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be effected using the thumb of the same hand in which the device 300 is held. However, it is appreciated that additional control can be effected by using both hands. As a handheld device 300 that is easy to grasp and desirably pocketable, the size of the device 300 must be kept commensurately small. Of the device's dimensions, limiting its width is important for the purpose of assuring cradleability in a user's hand. Moreover, it is preferred that the width of the device 300 be maintained at less than eight centimeters (approximately three inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously elongated so that its height is greater than its width, but still remains easily supported and operated in one hand.

A potential drawback is presented by the small size of the device 300 in that there is limited exterior surface area for the inclusion of user input and device output features. This is especially true for the "prime real estate" on the front face 370 of the device 300, where it is most advantageous to include a display screen 322 that outputs information to the user. The display screen 322 is preferably located above a keyboard 332 that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the device 300, an alphabetic keyboard 332 is provided. In the examplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld electronic device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in the navigation row 70 including the navigation tool 327. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figures 3A, 3B, 3C, 3D:
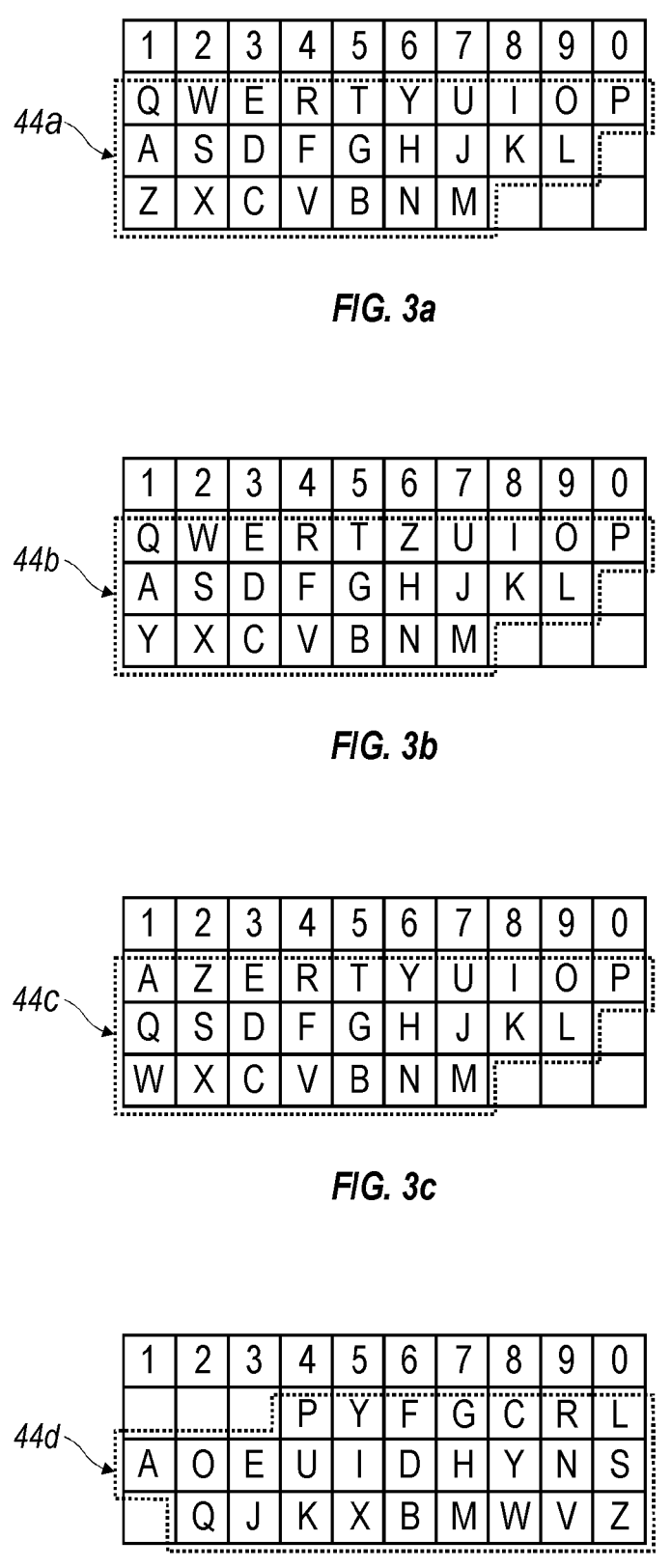

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other examplary embodiments, keyboards having multi-language key arrangements can be implemented.

Figure 10:
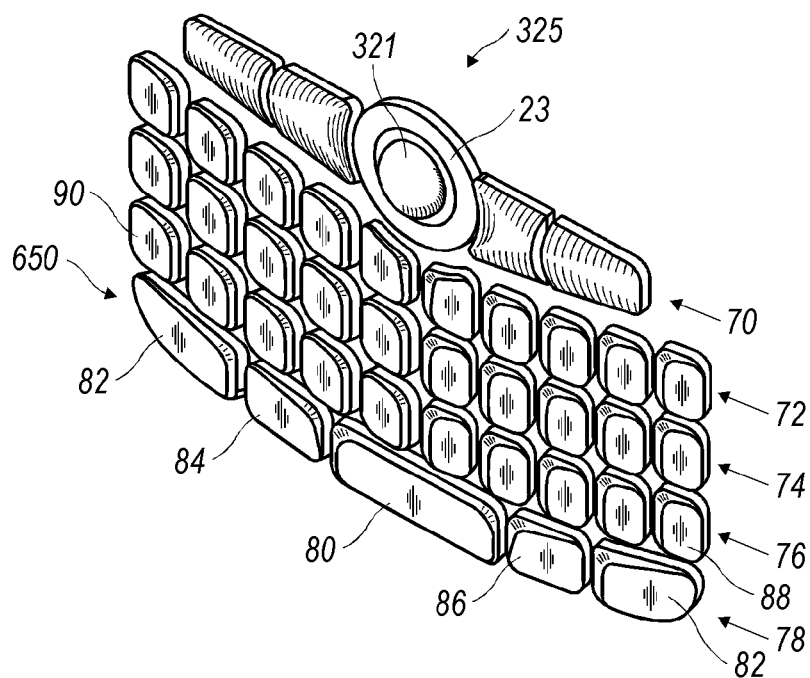
FIG. 10 is a perspective view of the keyboard illustrated in FIG. 9.
Figure 11:
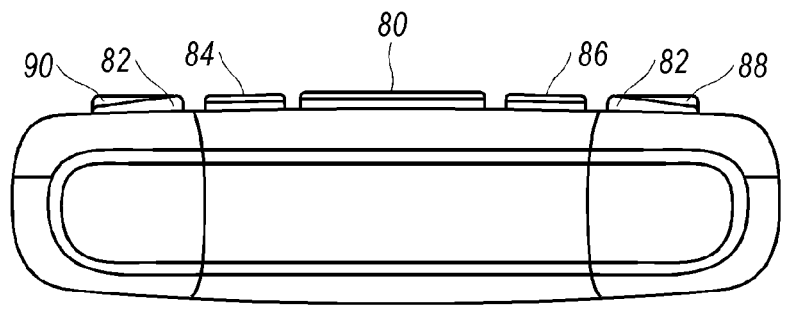
FIG. 11 is an end-on view of the keyboard illustrated in FIGS. 9 and 10.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another examplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys, as best shown in FIGS. 9 and 10. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E. 161 form. In addition, FIG. 6 also incorporates alphabetic characters according to the ITU Standard E. 161 layout as well.

Reference is now made to FIGS. 8-12, which disclose an examplary embodiment having a full alphabetic keyboard arrangement. In particular, as shown in FIGS. 8-12, only one letter of the alphabet is associated with any given alphabetic key within the keys of the keyfield. This is in contrast to reduced-format arrangements, in which multiple letters of the alphabet may be associated with at least some of the alphabetic keys of a keyboard. Additionally, as alluded to above and shown in the referenced figures, some of the alphabetic keys also have numbers, symbols, or functions associated with them. In the specifically illustrated embodiment, the alphabetic keys (including those also having numbers, symbols, or functions associated with them) are arranged in a QWERTY arrangement, although any of the other full-keyboard arrangements (QWERTZ, AZERTY, or Dvorak) may also be implemented within the scope of this disclosure.

To emulate as much as possible a full-sized keyboard as used, for example, with a personal computer, the alphabetic keys in the keyfield 650 are arranged in rows 72, 74, and 76. Furthermore, as is customary with such full-sized keyboards, the space key 80 is located in the center of the lowermost row 80 of the keyfield 650, below the letter (and to a certain extent number) rows 72, 74, and 76. To help make the hand-cradleable dimensions of the device possible, the shift keys 82 are located at each of the outermost ends of the lowermost row 80. This is in contrast to a typical full-size keyboard, in which the shift keys are at the ends of the lowermost row of alphabetic keys. Because they are the endmost keys of the lowermost row, the shift keys 82 are referred to as "corner keys." It is noted that in other arrangements that are deemed to be within the scope of this disclosure, the corner keys may have other functions besides or in addition to the shift function. Additionally, even though the illustrated keyfield 650 is fairly rectangular since all four rows of keys 72, 74, 76, and 78 have the same physical length, the term "corner keys" may also be used to describe the outermost keys in the lowermost row of keys in arrangements where the lowermost row of keys is shorter than those above it. In addition to the space key 80 and the shift (corner) keys 82, the presently described embodiment also includes an additional key on either side of the space key, between the space key and the corner keys, in the lowermost row of keys. For example, the presently described embodiment includes the "0" key 84 to the left of the space key 80 (part of the numeric keyfield superimposed or overlaid over certain keys of the alphabetic keyfield) and the "symbol" key 86 ("sym," used to indicate that a symbol instead of a letter is desired when pressing a given key) to the right of the space key 80.

Similarly, corner keys could be located at the top of the keyboard arrangement. In this situation, the corner keys at the top of the keyboard would provide enhanced access to the keys located below these corner keys.

As noted, the lowermost row of keys 78 is the same physical length as the other three rows of keys 72, 74, and 76 even though in the illustrated embodiment there are fewer keys in the lowermost row than there are in the rows above it. Therefore, in addition to the space key 80 (which is conventionally several times longer than the rest of the keys in the keyfield on a full-size keyboard), the shift (corner) keys 82 are also longer than the keys in the rows above the lowermost row 78 in order to "fill out" the lowermost row 78. For example, as shown in the illustrated embodiment, the shift keys 82 are twice as long as the keys in the rows above the lowermost row, and there are two keys (identified in more detail below) located above each shift key 82. Alternatively, in embodiments in which the only keys in the lowermost row are the space key and the shift keys, the shift keys could be even longer than twice the width of the keys above them, and there could, accordingly, be more than two keys above each of the shift keys.

Furthermore, in accordance with emulating a full-size keyboard as much as possible, the right endmost key 88 in the row 76 above the lowermost row 78 (i.e., immediately above the right-hand shift key 82) is the "enter" key. In some embodiments, the key immediately to the left of the "enter" key may be a function and/or a symbol key, e.g., the speaker/"$" key as shown in the illustrated embodiment.

On the other side of the keyfield shown as being mirror-symmetric about a vertically oriented axis of symmetry, the left endmost key 90 in the row 76 above the lowermost row 78 (i.e., immediately above the left-hand shift key 82) is the "alt" key. In some embodiments, the key immediately to the right of the "alt" key will likely be an alphabetic key and may also constitute a numeric key, e.g., the "Z"/"7" key as shown in the illustrated embodiment. The "enter" and "alt" keys (particularly the "enter" key) are frequently used keys, particular in the context of handheld wireless communication devices of the sort to which the present disclosure pertains. Therefore, according to one teaching of this disclosure, certain features are incorporated into the corner keys 82 to facilitate easier access to the "enter" and "alt" keys immediately adjacent to said corner keys 82.

More concisely, the present disclosure features and is configured as follows: a handheld wireless communication device that is sends and receives text messages. The device includes a hand cradleable body configured to be held in a text entry orientation in one hand of an operator during text entry, which body has a front face, a vertical centerline, and top and bottom portions. A key field is located at the front face of the body and includes a plurality of keys, of which a portion are alphanumeric input keys and a portion are function keys. The alphanumeric input keys include alphabetic keys having letters associated with them that are arranged in a QWERTY, QWERTZ, AZERTY, or Dvorak arrangement, which facilitates text entry. At least a portion of each of the keys has an upper surface that is higher than the front face of the body of the device. Furthermore, the key field includes a bottom corner key that has upper surface heights that decrease from a laterally inner portion of the bottom corner key toward a laterally outer edge thereof, and the laterally outer edge of the bottom corner key has a height that is lower than the height of a bottom edge of a key that is immediately above, also referred to as above-adjacent to the bottom corner key.

In an example, the keyboard includes "ramped" keys. In general terms, the top surface of the ramped-keys is inclined, but not linearly. Instead, the surface is curved and more closely resembles a cresting wave. The vertical portion of the wave basically provides an upturning wall against which the thumb engages when depressing the particular key. The very top of the wave is provided with a ridge that can be tactually sensed by the thumb, and the ridge also provides resistance to the thumb slipping over the top of the ramped-key. The top of the wave also provides an elevated portion to the key that can be engaged up above the rest of the key's surface.

The ramped-key is scalloped behind the wave portion, which is to say undercut slightly back toward the key body. In this way, the several surrounding keys collectively provide a clearance space around the central key thereby aiding actuation of only that central key while avoiding inadvertent actuation of those surrounding keys. This clearance zone establishes an enhanced actuation zone for the target key.

On keys of the right-hand keyfield, the left top corner contains the elevated wave portion. As an enhancement, the bottom right corner can be lowered or shaved down further enhancing the ramped nature of the key's top surface. For the keys of the left-hand keyfield, the configuration is mirrored. Because of the scallops, a top plan view of the key demonstrates that the elevated wave portion is not at the edge of the key, but in fact more centrally located with respect the top surface of the key.

With this arrangement, various further features are possible. For example, at least a portion of the upper surface of the bottom corner key at the bottom edge thereof may be substantially flush with the front face of the body. Additionally, the bottom, laterally outer corner of the bottom corner key may have a greater, convex radius of curvature than the radius of curvature of other corners of the bottom corner key. This allows the bottom edge of the bottom corner key to transition smoothly and continuously into the laterally outer edge of the bottom corner key.

Figure 12:
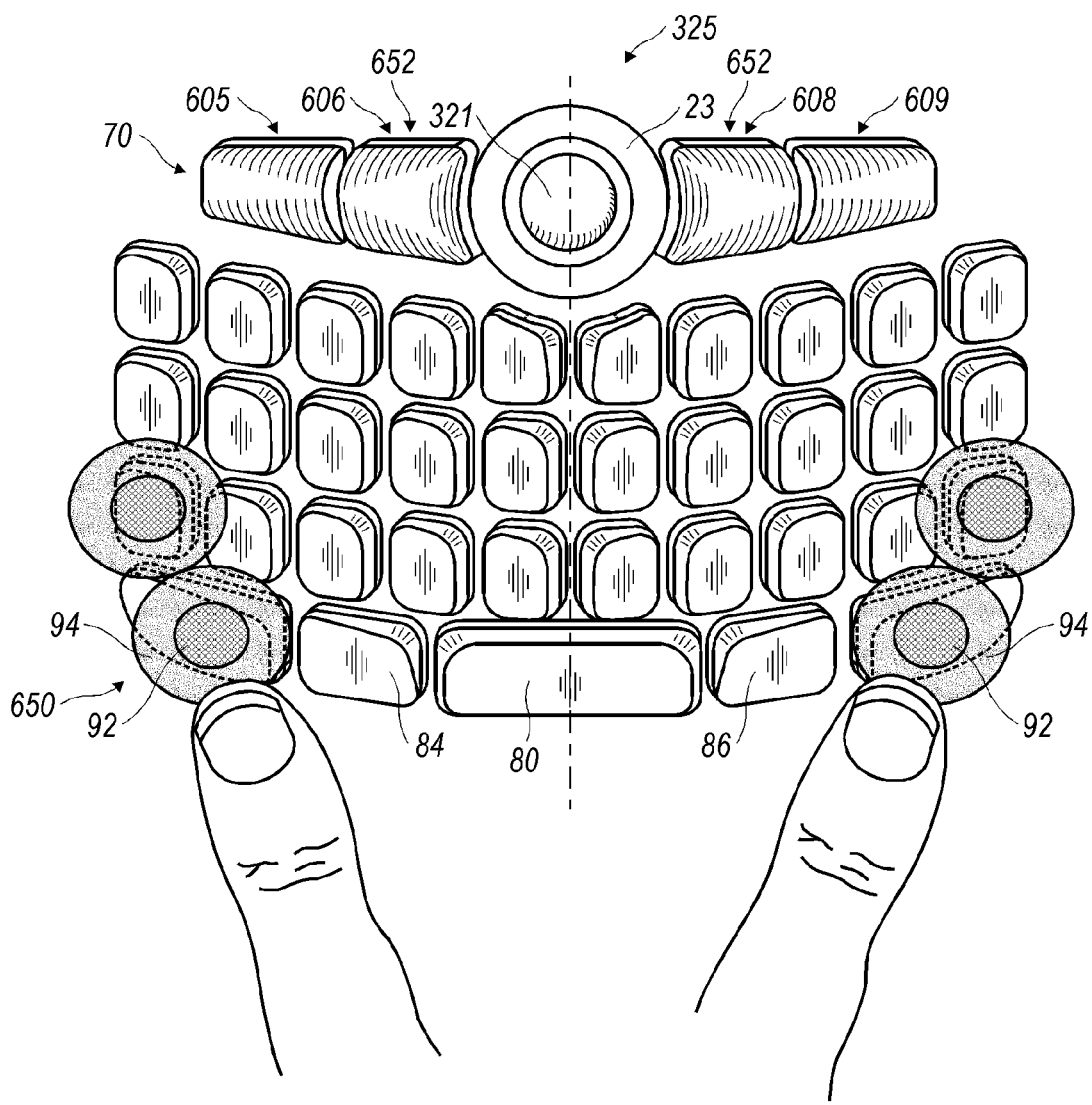
FIG. 12 illustrates key "target areas" and areas of finger overlap associated with the corner keys and above-adjacent keys on the keyboard of FIGS. 9-11.

Thus, as illustrated in FIGS. 8-12 (FIG. 11 in particular), the height of the corner keys with respect to the face of the device body decreases toward their laterally outer edges. As a result, (at least portions of) the bottom edges of the keys immediately above the corner keys (i.e., "above-adjacent" keys) are higher than the laterally outer edges of the corner keys. Depending on the relative sizes of the keys, this relationship may, but need not necessarily, extend laterally inwardly to more than just the outermost keys in the row above the corner keys. This relationship makes it easier to identify correctly, by feel, the keys above the corner keys. This is particularly advantageous in a device having a full keyboard arrangement where keys are typically smaller than in a reduced-format keyboard arrangement. For example, as illustrated in FIG. 12, the corner key "target areas" 92 are located on the upper surfaces of the corner keys 82, but the regions of finger overlap 94 extend very close to the lower edges—and in some cases may actually overlap the lower edges—of the keys immediately above the corner keys 82.

It should be appreciated that this relative height relationship is most advantageous along the top edges of the corner keys and the bottom edges of the above-adjacent keys to the corner keys. Additionally, this decreasing relative height relationship is most advantageous at the laterally outermost portions of the corner keys, although it preferably extends across the entire lateral width of the corner keys. Accordingly, it is sufficient for purposes of this disclosure for the corner keys to decrease in height from a laterally inner position (in contrast to an innermost edge) toward the laterally outermost edge.

Second, in addition to having the relative height relationship described immediately above, the corner keys are slightly truncated at their lowermost, laterally outermost portions (bottom outboard corners) 96. In particular, this portion 96 of each of the corner keys 82 has a radius of convex curvature that is significantly larger than the radius of curvature of the other corner portions 98 of the corner keys. As a result, the lower edges of the corner keys transition smoothly and continuously into the laterally outer edges of the corner keys without forming distinct corners at the lowermost, laterally outermost portions 96. This feature makes it easier to "reach over" the shift keys (corner keys 82) at the outer edges of the key field 650 to press the "enter" or "alt" keys while closely approximating an overall generally rectangular arrangement of the key field 650, which enhances aesthetics.

In addition to this relative configuration of the corner keys 82 and the above-adjacent keys, the configuration of keys in the navigation row 70—both with respect to the trackball navigation tool 325 and with respect to other keys in the navigation row 70—is arranged such that it is easier to tactilely differentiate among the several "user inputs" (e.g., the keys and the trackball navigation tool 325) in the navigation row 70 and to slidingly traverse the inputs, as well.

Figure 13:
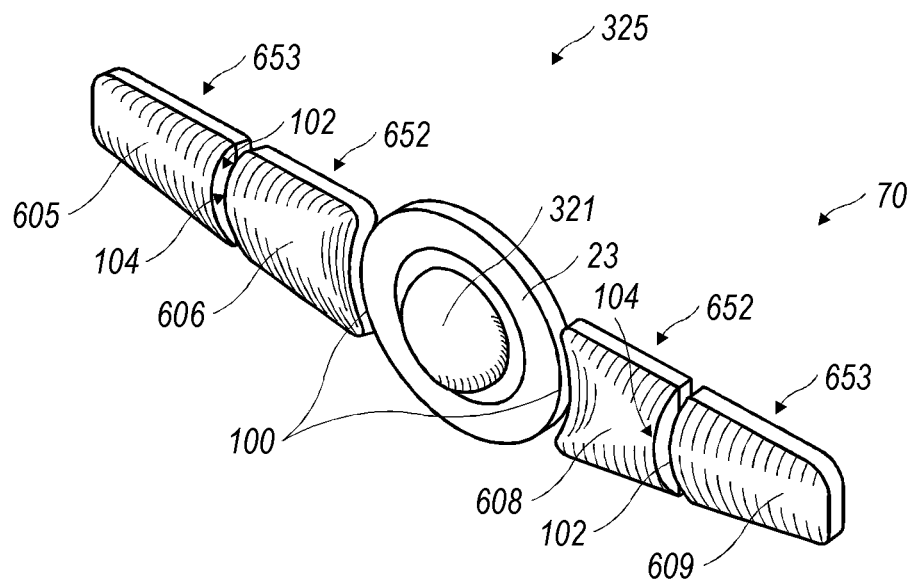
FIG. 13 is a perspective view of the navigation row illustrated in FIG. 9.
Figure 14:
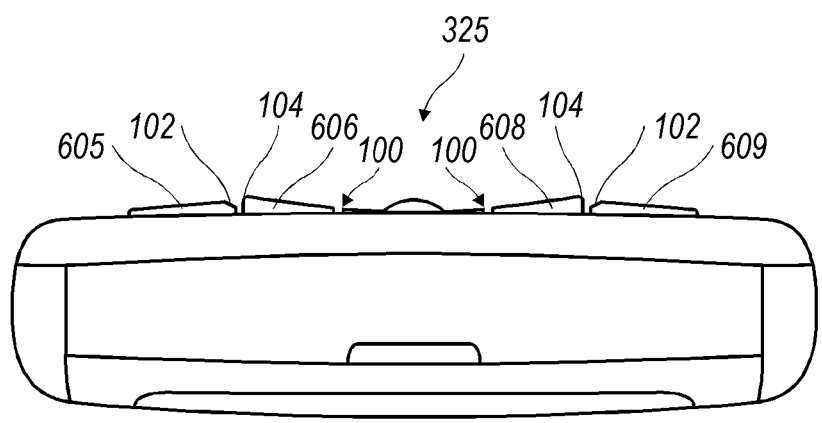
FIG. 14 is a section view of the navigation row illustrated in FIG. 13.
Figure 15A:
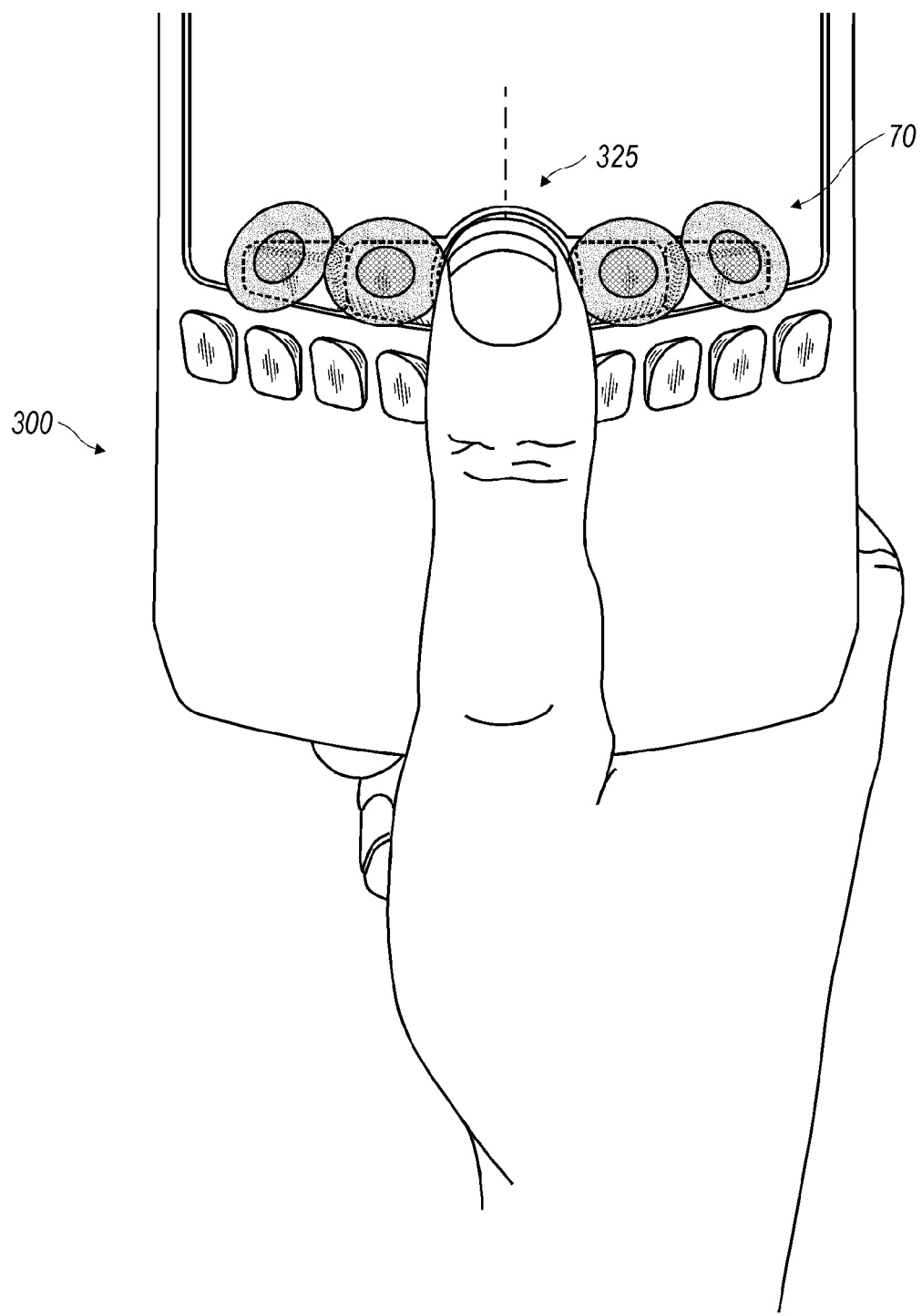
FIGS. 15a-15e illustrate a user using the navigation row illustrated in FIGS. 13 and 14.
Figure 15B:
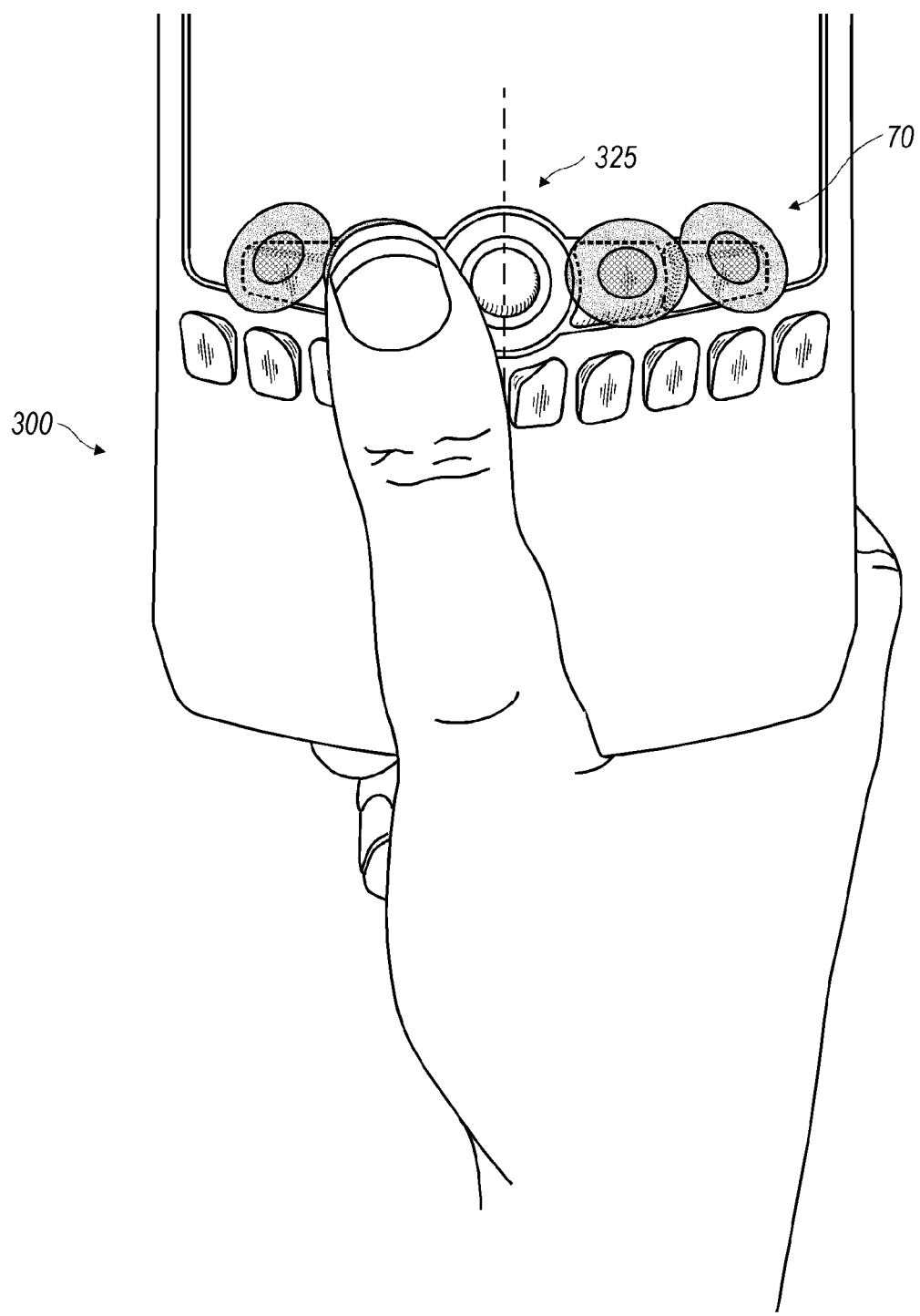
Figure 15C:
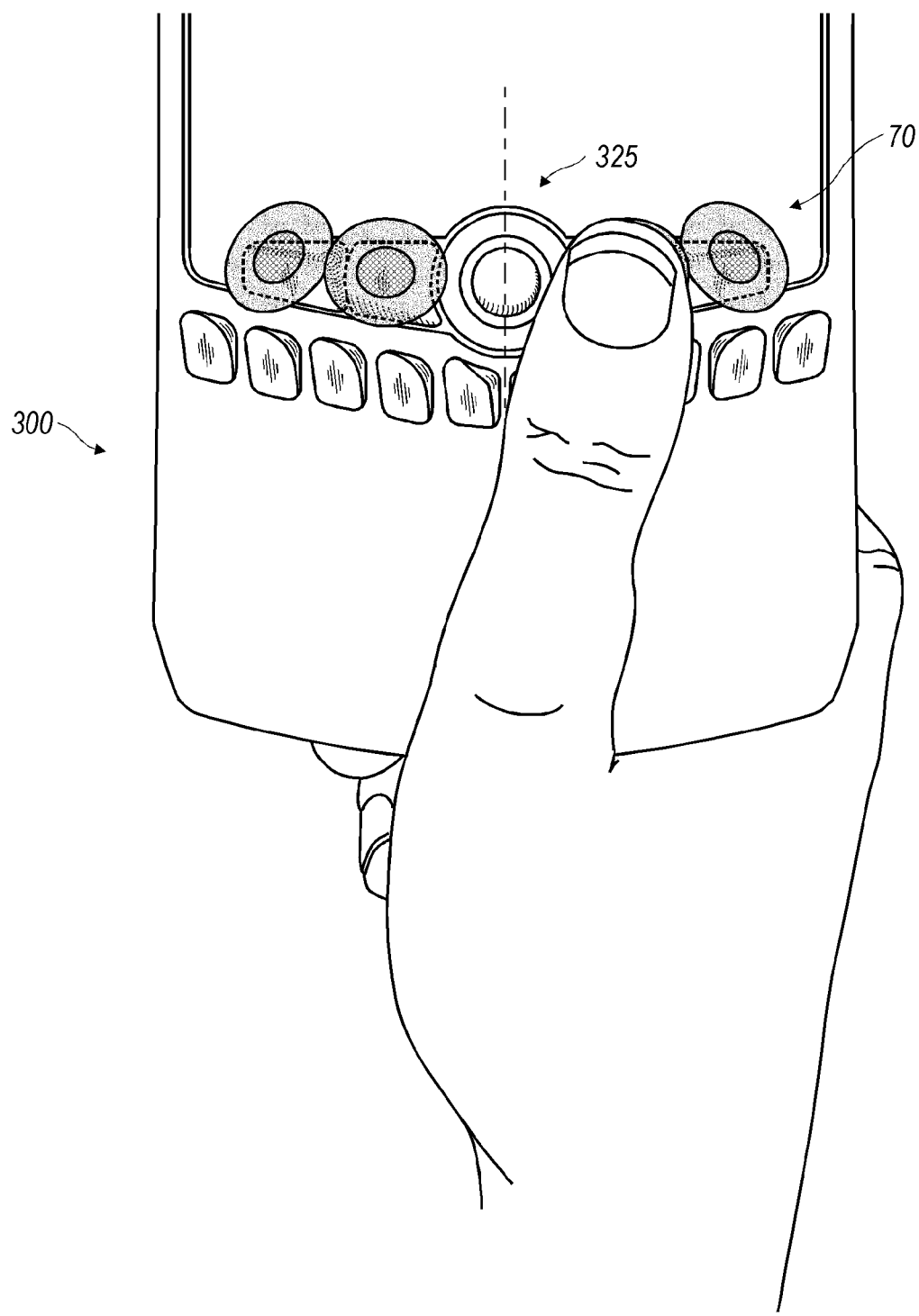

Referring once again to the drawings, as best illustrated in FIGS. 13 and 14, the height of the menu keys 652 (namely the flanking menu call-up key 606 and the escape or back key 608) with respect to the face 370 of the device body decreases from the laterally outer edges of the flanking keys 652 toward their laterally inner edges. This decreasing-height profile advantageously extends laterally across the entire width of the flanking keys 652, although it suffices for purposes of this disclosure that it extends just from mid-portions of the flanking keys 652 toward their laterally inner edges. At their laterally inner edges, the flanking keys 652 are essentially the same height with respect to the face 370 of the device body as the peripheral portions 100 of the trackball navigation tool 325 (e.g., the periphery of the outer ring 23) at which the flanking keys 652 are adjacent to the trackball navigation tool 325. As a result of this configuration, the upper surfaces of the flanking keys 652 are generally tactilely continuous with the peripheral portions of the trackball navigation tool 325. The "valley" configuration of the flanking keys 652 with the trackball navigation tool 325 in the center "trough" of the valley makes it very easy and comfortable for a user to navigate with the navigation row 70, "rocking" back and forth between menus using the menu keys 652 to do so while navigating with the trackball navigation tool 325 as illustrated in FIGS. 15a, 15b, and 15c.

Figure 15D:
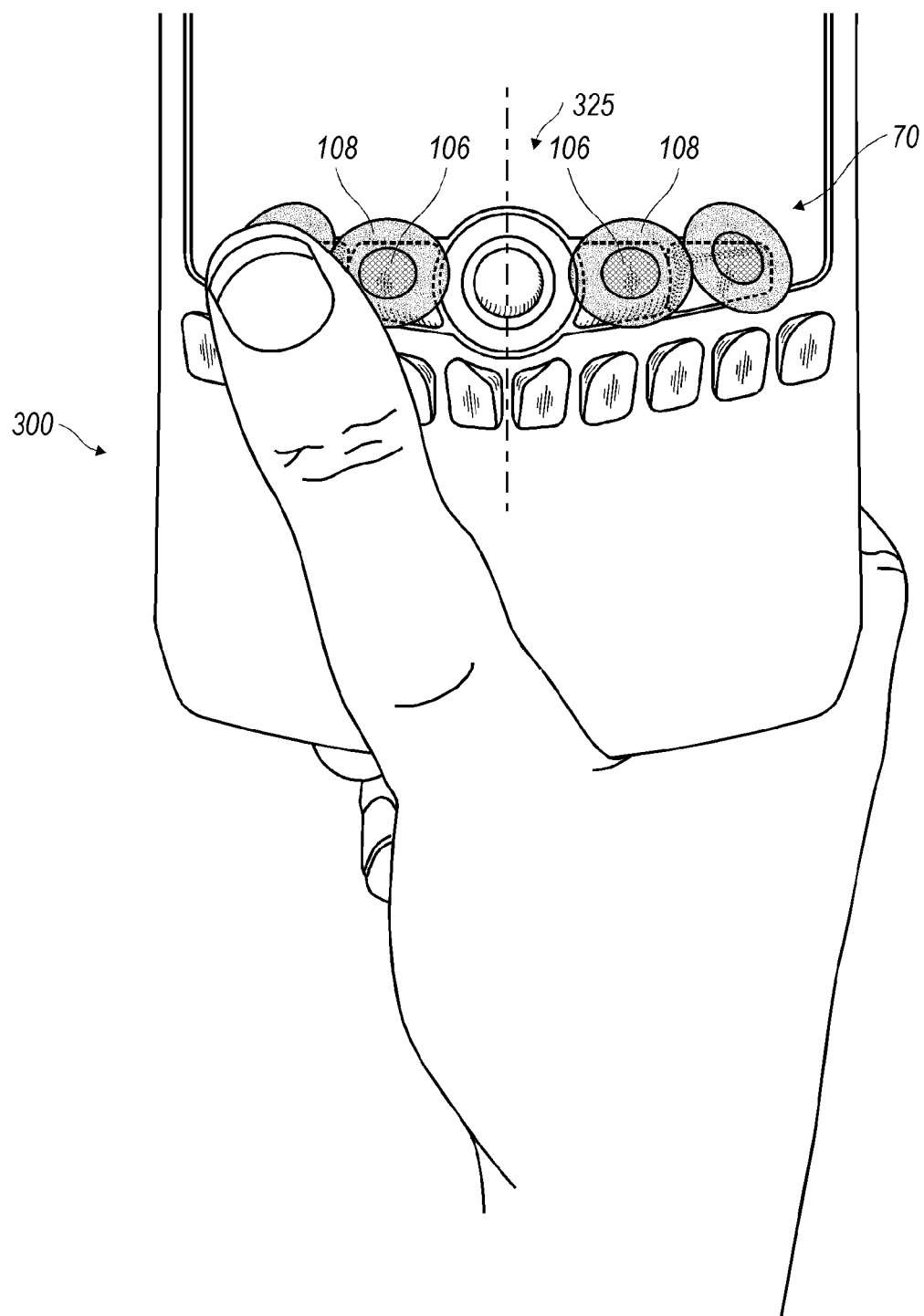
Figure 15E:
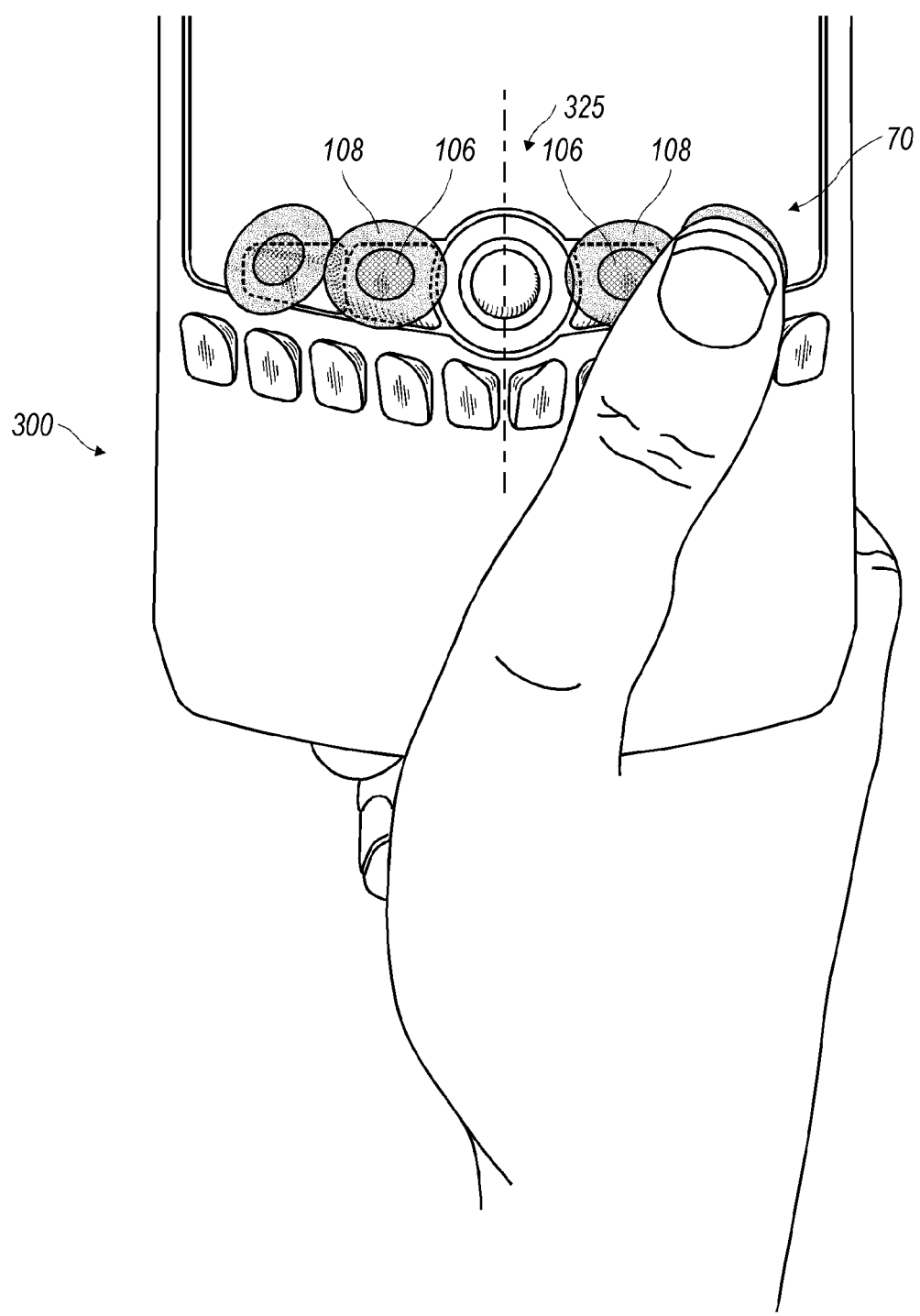

Additionally, at their laterally outer edges, the height of the flanking keys (with respect to the face of the device body) is greater than the height (with respect to the face of the device body) of the laterally inner edges of the outer keys (e.g., the call initiate and call end buttons 605, 609). Furthermore, the laterally inner edges of the outer keys may be chamfered, as at 102, to increase the amount of height differential between the flanking keys 652 and the outer keys at the junction between them. Still further, in addition to sloping upwardly from their laterally inner edges toward their laterally outer edges, the flanking keys preferably have laterally outer edges that are hump-shaped or crowned, as best shown at 104 in FIG. 13. This combination of features makes it particularly easy to differentiate between the flanking keys 652 and the outer keys when selecting between them, as illustrated in FIGS. 15d and 15e. In particular, although the "target areas" 106 of the flanking keys 652 are generally centered on the upper surfaces of those keys, the regions 108 of finger overlap may extend beyond the outer edges of those keys and encroach on the outer keys, as illustrated in those two figures.

To further enhance user comfort, the body of the device 300 may be referred to as a waisted, center-tapered, or necked-down configuration. In particular, the upper and lower ends 110, 112 of the device 300 (FIG. 1) are slightly wider than the mid-portion 114 of the device 300, with the sides 15 and 16 being slightly concave. For example, in an examplary embodiment, the ends 110, 112 of the device may be of the order of 62 millimeters in width, whereas the mid-portion 114 may be 60 millimeters in width. Such a flared top and bottom configuration fits more comfortably against the palm of the user's hand—in particular, against the fleshy part at the base of the thumb where the bottom flare is concerned—and helps to prevent the device 300 from slipping out of the user's hand. The top-end side flare also provides a convenient and comfortable thumb rest (see FIG. 1) and facilitates user control over the device 300, particularly when the bottom flared portion is firmly anchored in the user's palm.

Furthermore, the corners 116 of the device 300 are also configured to enhance user comfort. In particular, they are configured such that the left and right sides of the body transition smoothly into the upper and lower ends of the body. More particularly, the corners are chamfered as shown in FIG. 1. This, too, enhances user comfort—particularly with respect to the lower corners—since the lower corners in particular may be pressed firmly into the user's palm, especially during one-handed operation of the device 300.

Finally, with regard to user comfort features, the sides 15, 16 of the device 300 are preferably provided with (or even made entirely from) soft-touch material such as a rubberized coating, soft plastic, or the like. In this regard, the soft-touch material preferably covers the lower two-thirds of the sides 15, 16 of the device 300 (lower in this context being taken from the front of the device 300 toward the back of the device 300) and covers the side wrap-around portions 15a, 16a of the body sides 15, 16 (see FIG. 7) so as to extend at least partially onto the back surface of the device 300. Additionally, the soft-touch material also preferably covers the bottom wrap-around portions 15b, 16b of the body sides 15, 16 so as to extend at least partially onto the lowermost (i.e., the bottom end) surface of the device 300. In at least one embodiment, the soft-touch material also covers the bottom portion of bottom piece 18. In combination with the concave contoured sides 15, 16 and advantageously rounded corners thereof, the soft-touch material renders the device 300 easier to grip and use. Conveniently, the soft-touch material provides improved comfort when holding the device 300.

As described above, the International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 9, the numeric key arrangement can be overlaid on a QWERTY arrangement. The numeric arrangement as shown can be aptly described as a top-to-bottom ascending order three-by-three-over-zero pattern While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

Examplary embodiments have been described hereinabove regarding both handheld electronic devices 300, as well as the communication networks 319 within which they operate. Again, it should be appreciated that the focus of the present disclosure is enhanced usability of today's more sophisticated wireless handheld communication devices 300 taking into account the necessary busyness of the front face real estate of these more compact devices that incorporate additional user interfaces.

What is claimed is:
1. A keyboard comprising:
a plurality of keys arranged linearly in a plurality of columns and a plurality of rows, the plurality of keys extending above a case body and comprising at least one bottom corner key located at a respective end of one of a last row of the plurality of rows or a last column of the plurality of columns,
wherein each respective at least one bottom corner key has a respective upper surface that decreases in height from a respective ridge at a laterally inner portion of the each respective at least one bottom corner key toward a laterally outer edge thereof, and an adjacent key located above a respective bottom corner key has a bottom edge that is higher above the case body than the laterally outer edges of the respective bottom corner key.

2. The keyboard as recited in claim 1, wherein the plurality of keys are mirror-symmetric about a vertically oriented axis of symmetry.

3. The keyboard as recited in claim 1, wherein the at least one bottom corner key comprises two bottom corner keys.

4. The keyboard as recited in claim 1, wherein each bottom corner key is at least approximately twice as wide as said above-adjacent key.

5. The keyboard as recited in claim 1, wherein a respective bottom lateral outer corner of each respective bottom corner key has a greater radius of curvature than a respective radius of curvature of any other corner of the respective bottom corner key.

6. The keyboard as recited in claim 5, wherein the greater radius of curvature is significantly larger than the respective radius of curvature, and wherein a bottom edge of each of the bottom corner keys transitions smoothly and continuously along said greater radius of curvature into said laterally outer edge of each of the bottom corner keys.

7. The keyboard as recited in claim 1, wherein each bottom corner key is a function key.

8. The keyboard as recited in claim 1, wherein each bottom corner key is a shift-function key.

9. An electronic device comprising:
a housing;
a display provided in the housing; and
a keyboard including a plurality of keys arranged linearly in a plurality of columns and a plurality of rows, the plurality of keys comprising at least one bottom corner key located at a respective end of one of a last row of the plurality of rows or a last column of the plurality of columns,
wherein each respective at least one bottom corner key has a respective upper surface that decreases in height from a respective ridge at a laterally inner portion of the each respective at least one bottom corner key toward a laterally outer edge thereof, and
a bottom edge of an adjacent key above a respective bottom corner key is higher than laterally outer edges of the respective bottom corner key.

10. The keyboard as recited in claim 1, wherein a respective bottom edge of each of a plurality of adjacent keys in an adjacent row that is immediately-above the respective bottom corner key is higher than the laterally outer edge of the respective bottom corner key.

11. The keyboard as recited in claim 1, wherein the plurality of keys are located on a front face of a body, and
at least a portion of a bottom edge of the upper surface of the at least one bottom corner key is substantially flush with the front face of the body.

12. The keyboard as recited in claim 1,
wherein the respective ridge is removed from a top edge of the respective at least one bottom corner key,
the upper surface decreasing in height between the ridge and a bottom edge of the respective at least one bottom key, and
the upper surface further being scalloped between the ridge and the top edge of the respective at least one bottom key.

13. The keyboard as recited in claim 1,
wherein the respective upper surface the each respective at least one bottom corner key decreases in height from the respective ridge toward the laterally outer edge with a crested wave portion.

14. The keyboard as recited in claim 1, wherein the at least one bottom corner key is located at a respective end of a last row of the plurality of rows.

15. The keyboard as recited in claim 1, wherein the at least one bottom corner key is located at a respective end of a last column of the plurality of columns.

\* \* \* \* \*